(12) United States Patent
Faist et al.

(10) Patent No.: US 11,151,764 B2
(45) Date of Patent: Oct. 19, 2021

(54) DATA PREPARATION FOR GRAPH DEPICTION

(71) Applicant: VEGA Grieshaber KG, Wolfach (DE)

(72) Inventors: Fridolin Faist, Oberwolfach (DE); Florian Zimmermann, Schiltach (DE); Andreas Isenmann, Haslach im Kinzigtal (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 16/970,474

(22) PCT Filed: Feb. 22, 2019

(86) PCT No.: PCT/EP2019/054437
§ 371 (c)(1),
(2) Date: Aug. 17, 2020

(87) PCT Pub. No.: WO2019/170435
PCT Pub. Date: Sep. 12, 2019

(65) Prior Publication Data
US 2021/0118209 A1   Apr. 22, 2021

(30) Foreign Application Priority Data

Mar. 8, 2018 (DE) .................... 10 2018 203 553.9

(51) Int. Cl.
G06T 11/20 (2006.01)
G06F 17/16 (2006.01)
G06F 16/26 (2019.01)

(52) U.S. Cl.
CPC ............ *G06T 11/206* (2013.01); *G06F 17/16* (2013.01)

(58) Field of Classification Search
CPC .................................................. G06T 11/206
See application file for complete search history.

(56) References Cited

U.S. PATENT DOCUMENTS 9,591,314 B2   3/2017   Isenmann
9,936,050 B2   4/2018   Gerding et al.
(Continued)

FOREIGN PATENT DOCUMENTS

DE   10 2014 105 075 A1   10/2015
EP       2 317 409 A1      5/2011
(Continued)

OTHER PUBLICATIONS

German Office Action dated Apr. 19, 2018 in Patent Application No. 10 2018 203 553.9 (with English translation), 9 pages.
(Continued)

Primary Examiner — Jeffery A Brier
(74) Attorney, Agent, or Firm — Oblon, McClelland, Maier & Neustadt, L.L.P.

(57) ABSTRACT

A method for preprocessing data records for rendering in a diagram having first, second and third coordinates, wherein values of the first coordinate of the diagram, and/or values of the second coordinate of the diagram are discretized in bins. The method includes assigning to each bin of the first coordinate or to each bin of the second coordinate, data records having a value of the first coordinate or values of the first coordinate and the second coordinate, checking a number of data records that is assigned to each bin; when only one data record is assigned to a bin, instructing rendering the diagram using a third coordinate value of the data record, and when multiple data records are assigned to a bin, instructing rendering the diagram using selected third coordinate values, determined according to a predetermined criterion in which at least one value is chosen and/or aggregated.

18 Claims, 4 Drawing Sheets

(56) References Cited

U.S. PATENT DOCUMENTS

| | | | |
|---|---|---|---|
| 2011/0249000 A1 | 10/2011 | Isenmann et al. | |
| 2014/0195015 A1 | 7/2014 | Faist et al. | |
| 2014/0282168 A1 | 9/2014 | Mukhi et al. | |
| 2015/0154270 A1 | 6/2015 | Marinoiu et al. | |
| 2018/0365193 A1* | 12/2018 | Chattopadhyay | G06F 17/12 |
| 2019/0065563 A1* | 2/2019 | Petculescu | G06T 11/206 |

FOREIGN PATENT DOCUMENTS

| | | |
|---|---|---|
| EP | 2 790 408 A1 | 10/2014 |
| EP | 2 752 724 B1 | 6/2016 |

OTHER PUBLICATIONS

International Search Report dated Apr. 11, 2019 in PCT/EP2019/054437 filed on Feb. 22, 2019, 2 pages.

\* cited by examiner

DATA PREPARATION FOR GRAPH DEPICTION

The invention relates to the preprocessing of data that is to be rendered in diagram form by means of a display device or a printer, particularly in the monitoring of industrial plants.

BACKGROUND

Industrial production processes are increasingly being controlled and monitored by centralized electronic control systems. Using remotely operated actors, such as valves or switches, action may be taken in the process in many places. This may be initiated by an operator, but also by a control loop or a control software.

In order to be able to take targeted action, a monitoring of the actual state of the process is indispensable. To this end, usually a plurality of field devices is provided in the plant, and each field device records certain measurement values in short temporal succession. These measurement values are archived in a database, and/or on the field devices themselves.

Particularly for the analysis of problems in the plant, the measurement data is frequently drawn in diagram form, e.g., to spot irregularities in a variation in time. Frequently, the observed time interval is interactively changed, e.g., in order to first localize an irregularity and subsequently study it in more detail. If the quantity of data is larger, the available network bandwidth for the transmission, and/or the available computing power, may become bottlenecks that hobble the interactive work.

Problem and Solution

It is therefore the objective of the invention to provide a method with which the creation of diagrams using a given configuration of hardware and network bandwidth may be accelerated.

This objective is achieved by a method according to the main claim, an associated computer program, computer-readable media or download product according to further independent claims, as well as a field device or a controller for a field device according to a further independent claim. Further advantageous embodiments are given in the respective dependent claims.

DISCLOSURE OF THE INVENTION

Within the scope of the invention, a method for preprocessing data records for the rendering in a diagram was developed. Each data record assigns a value of a third coordinate to a value of a first coordinate, or to a combination of a value of a first coordinate with a value of a second coordinate. The third coordinate is the property of interest whose dependency on one variable (first coordinate) or two variables (second coordinate) is to be drawn in the diagram. Here, it is not excluded that the data record comprises further variables on which the property of interest depends. Thus, for example, one or two out of a plurality of variables on which the property of interest depends may be chosen for the rendering in the diagram.

For example, in a right-handed Cartesian coordinate system, the first coordinate may be the x coordinate. The data records may then represent the dependency of an arbitrary quantity on one variable. In this case, the quantity would have to be plotted on the y axis over the variable on the x axis, i.e., the y coordinate would be the third coordinate. But the first coordinate may also, for example, represent the time, i.e., the diagram then represents a variation of the plotted property in time. Particularly when using diagrams of variations in time for troubleshooting, it is relatively frequently necessary to change the observed window in time and, e.g., "zoom into" an event. Every change of the window necessitates a re-rendering of the diagram.

If the first coordinate is the x coordinate of a Cartesian coordinate system, for example, the second coordinate may be the z coordinate. The data records may then represent the dependency of a quantity on two variables. The quantity would then have to be plotted in the diagram as a "mountain range" with a "height" along the y axis that varies depending on a "location" in the xz plane. I.e., the y coordinate would again be the third coordinate. On the x axis and on the z axis, the two variables on which the quantity depends would have to be plotted.

In the diagram, the values of the first coordinate, and/or the values of the second coordinate, are discretized in bins. For example, the cause of this may be that the lengths of the coordinate axes that are rendered in the diagram correspond to a finite number of pixels on a screen or on a printer. For example, if a variation in time of a quantity over a time interval of one week is rendered on a screen on which the time axis has a length of 4,000 pixels, each pixel on the time axis defines a bin of 2.52 minutes.

The inventors have found that this is a possible place to act upon in order to save computing capacity and bandwidth.

To this end, each bin of the first coordinate, and/or the second coordinate, is assigned the data records whose value of the first coordinate, respectively of the second coordinate, lies in the respective bin, e.g., [0, 2.52 minutes) or [2.52 minutes, 5.04 minutes). The number of data records that are assigned to each bin is checked.

If only one data record is assigned to a bin, the value of the third coordinate of this data record is assigned to the bin for the rendering in the diagram. For example, if the bins have a lengths of 2.52 minutes, and the quantity of interest was only measured once each at the first and third full minute, the first measurement value is assigned to the first bin, and the second measurement value is assigned to the second bin for the rendering in the diagram.

However, if multiple data records are assigned to a bin, from the respective values of the third coordinate, at least one value is chosen and/or aggregated according to a predetermined criterion and then assigned to the bin for the rendering in the diagram.

For example, this may be the case if measurements are captured on a time scale that is a lot finer than the splitting of the time axis into bins. For example, if the measurement values are captured at time intervals of one second, each bin that is 2.52 minutes long comprises about 150 measurement values. In most cases, these measurement values need to be obtained from a data source over a network and then graphically processed for the creation of the diagram.

The inventors have recognized that the potential for savings lies here. If a bin is, due to the resolution of the screen or printer, the smallest unit for visualizing the temporal spacing of data records, it does not make sense to compute a graphic rendering with a sub-bin resolution only to fall back to the best realizable resolution of 1 bin when physically outputting the diagram. The choosing and/or aggregating allows to create the diagram right from the start with exactly the resolution with which it may also be physically outputted, or also with an arbitrary coarser resolution. No effort is "wasted" anymore on the creation of a higher resolution that cannot be outputted in the end.

It is well possible that in one and the same diagram, there are bins to which only one data record is assigned right from the start, as well as bins to which many data records are initially assigned. For example, the temporal resolution with which the measurements are carried out may be variable in time. For each bin, it is decided separately whether the value of the third coordinate from the only data record assigned to this bin is used or whether a choice, respectively an aggregation, is produced from multiple values from several data records.

In a particularly advantageous embodiment, the criterion comprises choosing the maximum, the minimum, and/or the median, and/or the aggregation by averaging. The median and the average constitute a maximal compression of the data records originally assigned to the bin, wherein the median is somewhat more resistant against outliers. Particularly for the monitoring of industrial processes, choosing the maximum and the minimum, and rendering both the maximum and the minimum in the diagram, is advantageous. In this manner, it may be visualized in a very transparent manner by how much the range of variation of the monitored quantity changes in time. For example, the variation time of this range of variation may allow conclusions as to certain technical defects of the measurement, such as a temperature-dependent drift of a sensor.

In a particularly advantageous embodiment, the data records are kept available on a delivering device, and the diagram is to be created by a rendering device. The choosing and/or aggregating is then performed on the delivering device. In this manner, during the transfer from the delivering device to the rendering device, a considerable amount of bandwidth for data records whose values of the third coordinate are not needed is economized. Conversely, this means that given a certain available bandwidth, it becomes practical to conduct the keeping of the data separately from the rendering device and to transmit the data via the network on demand.

Advantageously, a database is chosen as the delivering device. The database may then be queried, e.g., in SQL, right from the start so that, for the data records assigned to a particular bin, it delivers only the corresponding choice or aggregation, respectively, rather than all individual values.

In a particularly advantageous embodiment, data records are chosen whose values of the third coordinate are measurement values that have been determined by a field device which stands in direct relationship with an industrial production process. This field device may particularly be configured as a fill level gauge, a limit level gauge, a density meter, a flow meter or a pressure gauge. Using measurement devices of this kind, measurement values are frequently recorded continuously with a temporal resolution that is sufficient for a detailed diagnosis in case problems occur in the production process. However, over the vast majority of the time, the production process runs without disruptions, so that the measurement values are only needed with a considerably lower temporal resolution for the ongoing monitoring. But on the other hand, capturing the measurement values with the higher temporal resolution cannot be avoided, so that in the case of a problem, the final cause ("root cause") that preceded the problem in time may be determined.

Out of this consideration, in a further particularly advantageous embodiment, the field device is chosen as the delivering device. This means that the field device does not constantly have to deliver the measurement values to a database with the maximum resolution. Rather, it may keep them locally and output them on demand in a highly compressed form for the rendering of diagrams. In this manner, storage space in the data base, as well as bandwidth on the link between the field device and the database, may be saved. For example, in many industrial control systems, the field devices are connected to bus topology networks that are cheap to install but provide a rather low bandwidth per field device.

For example, the field device may have a rolling memory for measurement values with high temporal resolution. In analogy to a flight recorder, in such a rolling memory, the respective newest recorded value displaces the oldest value. If a problem occurs and needs to be diagnosed, the field device may be instructed to "freeze" the state of the rolling memory. The data that might still be needed for the investigation of the cause of the problem earlier in time is then preserved in the memory.

For example, during normal operation, the field device may send its measurement values to the database only with a medium temporal resolution. This resolution may, for example, be set such that it just suffices for examining whether the operation, as a whole, runs normally or not. If a problem is present, the field device may be queried directly to access the more detailed data.

At the same time, the choosing, respectively the aggregating, of the measurement values avoids overly long waiting times when rendering the diagram, even if the network connection of the field device is narrow-banded. Thus, advantageously, a field device is chosen whose interface for the outputting of data records, respectively of values, is configured as a two-conductor interface or as a radio interface with a transmission duty cycle of at most 10%.

In a further particularly advantageous embodiment, using a similar method that, as described before, adapts the number of transmitted and graphically rendered data records to the discretization of the bins, notifications about relevant events or state changes that might be relevant for the values of the third coordinate are transferred into the diagram as well.

The events or state changes are assigned to values of the first coordinate, and/or the second coordinate. In particular, they may be assigned to a point in time.

The number of the notifications is checked that is assigned to each bin of the first coordinate, respectively of the second coordinate. If only one notification is assigned to a bin, this is assigned to the bin for the rendering in the diagram.

If, however, multiple notifications are assigned to a bin, one or more notifications are chosen and/or aggregated according to a predetermined criterion and then assigned to the bin for the rendering in the diagram.

In this manner, a cluttering of the diagram with notifications may be avoided. In many cases, it is sufficient to receive an information at all that there is at least one relevant notification for certain bins. The rendering of the notification in the diagram may then, for example, be configured as a clickable hyperlink, and a click on this hyperlink may lead not only to details about this one notification, but also to further waiting notifications.

The criterion for choosing the notifications may, for example, comprise a priority, and/or a category, of the notifications.

For example, a first important category consists in notifications about events that are directly related to the capturing of measurement values, and/or to individual measurement values. Such events may particularly indicate that something is wrong with the captured measurement values. One example for such an event is the complete interruption of the capturing of measurement values.

A second important category consists, for example, in "Error coming", i.e., in events that indicate the occurring of new generic error states. These events are not directly related to the capturing of measurement values, but may nonetheless influence it.

A third important category consists, for example, in "Error going". These events indicate that an error that was discovered before has been remedied. Because this means that the situation changes for the better, the probability that such an event is the cause for a larger problem is relatively low.

A fourth important category consists, for example, in configuration changes. As such, they are not error states, but normal events. However, changes to the settings on the field device may affect the capturing of measurement values. For example, if the spatial difference up to which several echoes are aggregated to one echo, or if the amplitude threshold for the detection of an echo is changed, this may cause the smoothing of the measurement values to vary, cause certain events to newly appear in the measurement values, or cause other events to no longer appear. Therefore, notifications about configuration changes facilitate the interpretation of measurement values in that certain sudden changes do not stem from errors in the system, but are rather home-made. But cases where a configuration change may set the cause for a larger problem are also conceivable. For example, the setting of an insufficient measurement range on the field device may cause future measurement values to be clipped on the limit of this measurement range. If these values are used for further calculations, invalid results are created, and if these are applied to actors, ultimately malfunctions may result.

The criterion for the choosing, respectively the aggregating, of notifications may also, for example, be freely combined from category and priority. For example, for each of the four mentioned categories, optionally leaving out "Error going", at least one event may be rendered in the diagram if at least one event had been previously assigned to the respective bin. Thus, the observer of the diagram always gets at least the information that one or more events of the respective category have occurred in the respective bin.

As described above, the method may be wholly or partially embodied in a software for the creation of diagrams, and/or in a software for a field device or for a controller that is connectable to field devices. For example, this software may be marketed as an update or upgrade for respective existing software and is therefore a product of its own. Therefore, the invention also relates to a computer program with machine-readable instructions that, when executed on a computer or on an embedded system, cause the computer, respectively the embedded system, to perform the method according to the invention. The invention also relates to a computer-readable medium or a download product with the computer program.

As described above, a field device of a controller for a field device may be equipped for performing the method in software as well as in hardware. For example, the field device may be equipped with a rolling memory for the capturing of detailed measurement values, so as to be able to resort to these measurement values on demand for troubleshooting without constantly transmitting the large data volume over the narrow-banded network connection of the field device even during normal operation. Thus, the invention also relates to a field device, respectively to a controller for a field device, that is configured for performing the method.

DESCRIPTION OF THE FIGURES

In the following, the subject-matter of the invention is illustrated using Figures, without intention to limit the subject-matter of the invention. It is shown:

FIG. 1 schematically shows how data records 1a-1h may be preprocessed for the rendering in a diagram 2. In the diagram 2, the values of the first coordinate 21 are discretized in bins, of which three bins 21a-21c are shown exemplarily. In the same manner, the second coordinate 22 may be discretized in bins 22a-22c if the quantity plotted in the third coordinate 23 depends on more than one variable.

Figure 1:
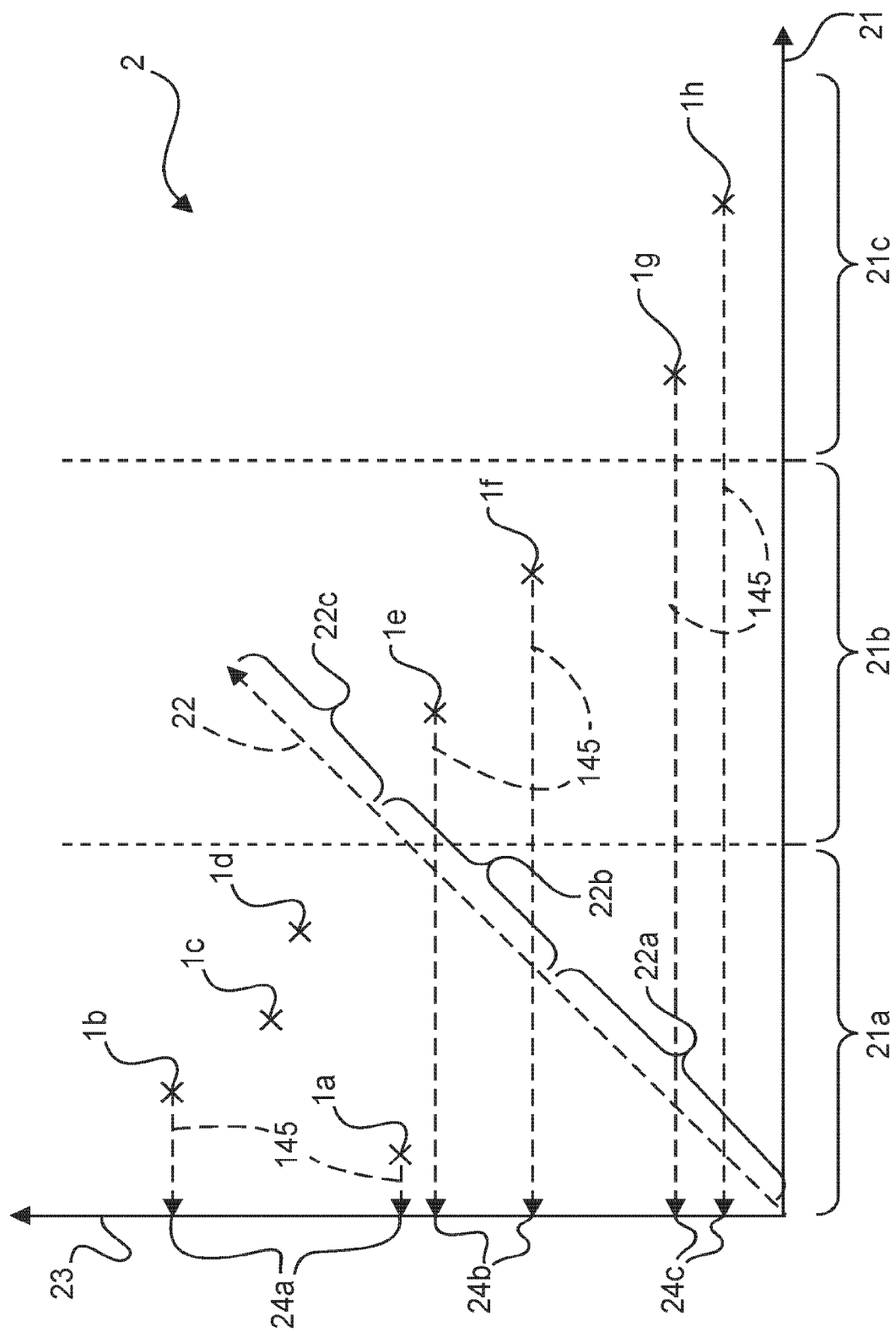
FIG. 1: Sketch of the principle of the preprocessing on one diagram 2.

In the example shown in FIG. 1, four data records 1a-1d are assigned to the first bin 21a of the first coordinate 21. Two data records 1e and 1f are assigned to the second bin 21b. Two more data records 1g and 1h are assigned to the third bin 21c.

According to the criterion 145, in this example, for every bin 21a-21c, the respective maximum and the minimum of the values of the third coordinate 23 in the data records 1a-1d; 1e, 1f; 1g, 1h assigned to the respective bin are chosen as values 24a, 24b, 24c that are to be rendered in the diagram 2. In the very simple example shown in FIG. 1, in the first bin 21a, this action economizes the data records 1c and 1d that do not have to be graphically processed anymore when rendering the diagram 2. In real applications, the amount of data to be processed may be reduced by factors of 150 and more.

Figure 2:
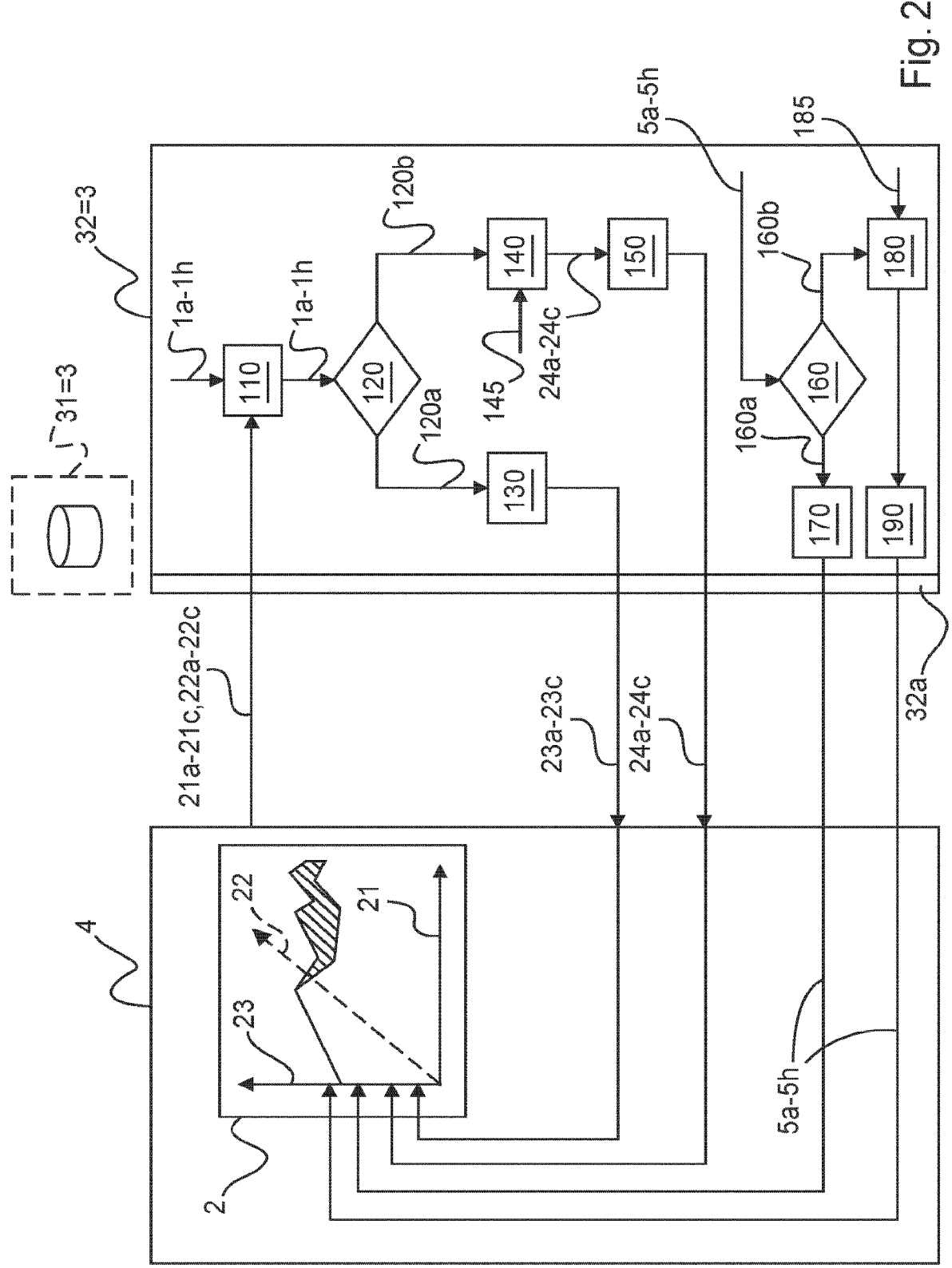
FIG. 2: Embodiment of the method 100.

FIG. 2 shows an embodiment of the method 100. In this embodiment, the diagram 2 is created by a rendering device 4, whereas the data records 1a-1h are kept on a delivering device 3. In this embodiment, the delivering device 3 is a field device 32. The interface 32a, over which the field device 32 is coupled to the rendering device 4, is a two-conductor interface or a radio interface with a limited transmit duty cycle. Thus, in this embodiment, unlike when using a database 31 with a broadband connection as delivering device 3, the data transfer to the rendering device 4 is an additional bottleneck.

The rendering device 4 transmits, to the field device 32, the information with which granularity the first coordinate 21, and optionally also the second coordinate 22, are discretized in bins 21a-21c, respectively 22a-22c, in the to-be-created diagram 2. In step 110, the field device 32 assigns all available data records 1a-1h to the bins 21a-21c, respectively 22a-22c. The number of data records 1a-1h assigned to each bin 21a-21c; 22a-22c is checked in step 120.

If only one data record 1a-1h is assigned to a bin 21a-21c, 22a-22c (result 120a), in step 130, the value 23a-23c of the third coordinate 23 from this record is assigned to the bin 21a-21c; 22a-22c for rendering in the diagram 2 and transmitted to the rendering device 4.

If, however, multiple data records 1a-1h are assigned to one bin 21a-21c; 22a-22c (result 120b), in step 140, values 24a-24c are chosen, respectively aggregated, from that according to a criterion 145. In step 150, these values 24a-24c are assigned to the respective bin 21a-21c; 22a-22c for the rendering in the diagram 2 and transmitted to the rendering device 4.

According to a similar scheme, notifications 5a-5h accruing in the field device 32 are reduced before the transmission to the rendering device 4. In step 160, it is checked how many notifications 5a-5h are assigned to each bin 21a-21c; 22a-22c. If only one notification 5a-5h is assigned to a bin (result 160a), in step 170, this is assigned to the bin 21a-21c; 22a-22c and transmitted to the rendering device 4. If, however, multiple notifications are assigned to a bin 21a-21c; 22a-22c (result 160b), in step 180, one or more notifications 5a-5h are chosen and/or aggregated according to a criterion 185. According to step 190, these are then assigned to the bin 21a-21c; 22a-22c for the rendering in the diagram 2 and transmitted to the rendering device 4.

Figure 3A:
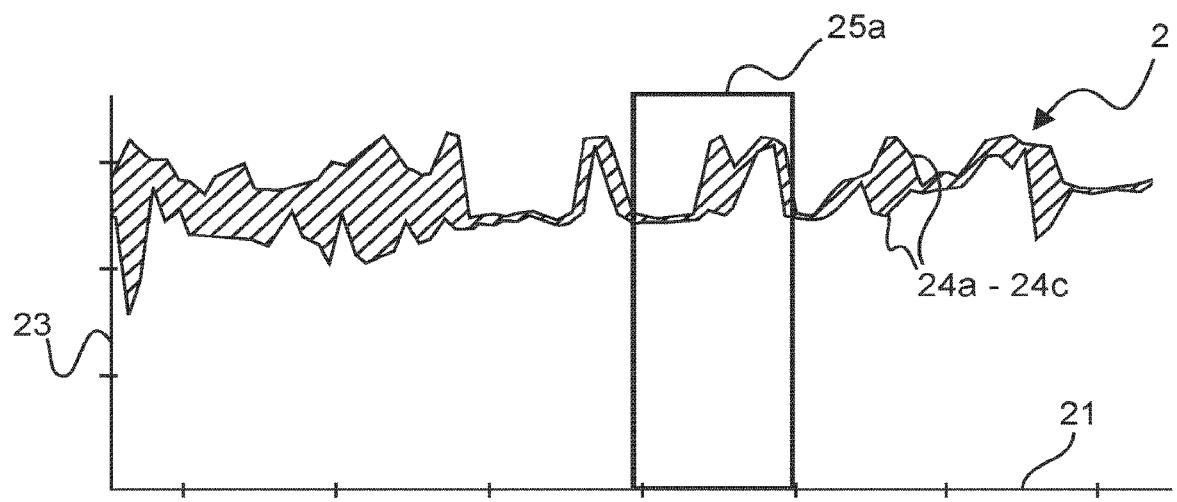
FIG. 3: Changing of the rendering of the diagram 2 in response to a zooming onto intervals 25a, respectively 25b, of the first coordinate 21.
Figure 3B:
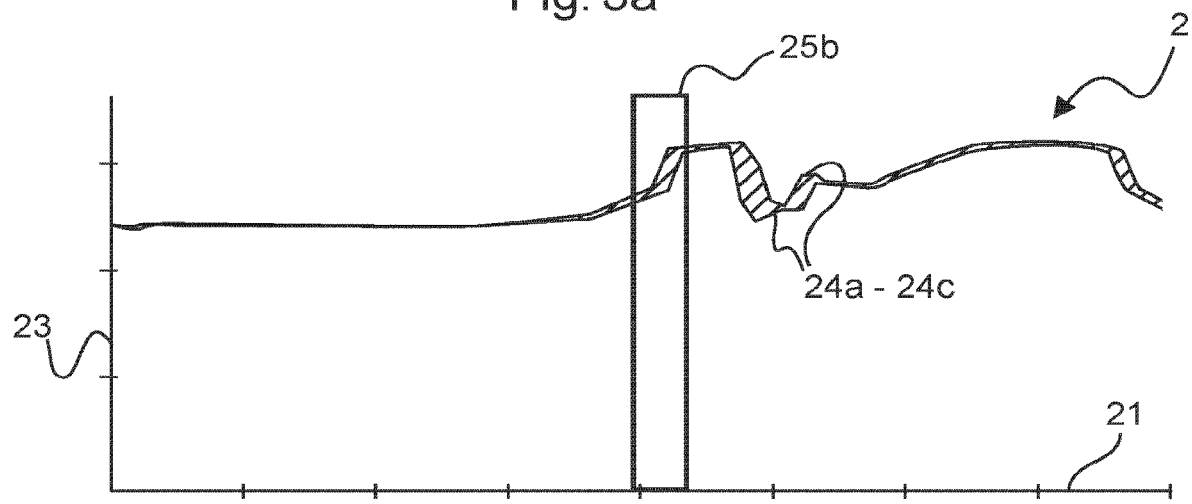
Figure 3C:
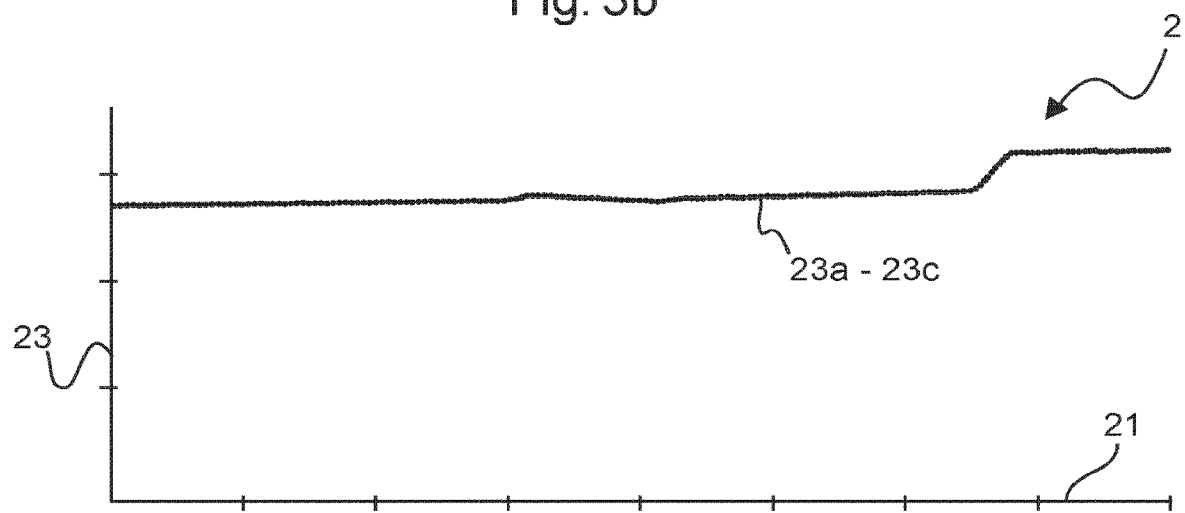

FIG. 3 shows exemplarily how the rendering of the diagram 2 changes depending on the window along the first coordinate 21 that is considered. Here, the first coordinate 21 is the time. In FIG. 3a, a window is considered that comprises one week, wherein the data records 1a-1h were captioned at time intervals of one second.

Thus, in the course of the week, 604,800 measurement points were captured, which corresponds to a much finer resolution than is technically renderable in the first place when printing the diagram 2: If the diagram were to be printed on DIN A4 in landscape orientation, fully utilizing the sheet (29.7 cm wide), the available amount of data would correspond to a print resolution of over 50,000 dpi. The maximum resolution of stock printers is considerably lower. What is more, a high-resolution screen that is typically used for the rendering of diagrams 2 has only on the order of 4,000 pixels in the width direction, which causes a discretization of the 604,800 measurement points to just 4,000 bins.

Therefore, as shown in FIG. 3a, only the maximum and the minimum of the values of the third coordinate 23 that are contained in the data records 1a-1h assigned to each bin 21a-21c are chosen as to-be-rendered values 24a-24c. Correspondingly, a considerably lower amount of data is to be transmitted to the rendering device 4 and graphically processed.

To study a phenomenon evident from the curve 24a-24c in more detail, a zoom into the windows 25a drawn into FIG. 3a is performed. This window is shown in detail in FIG. 3b. The window represents a time period of only one day i.e., with the same resolution that is technically available for the rendering of the diagram 2, seven times as many details may be highlighted.

To study a specific increase of measurement values in more detail, a zoom into the window 25b drawn into FIG. 2b is performed. This window is shown in detail in FIG. 3c. The window represents a time period of one hour. At this zoom level, only one value 23a-23c of the third coordinate 23 is assigned to each of the bins 21a-21c, and correspondingly, it is directly rendered in the diagram 2.

Particularly in the monitoring of industrial processes, frequently, only diagrams that represent longer time periods are considered initially, and only on demand, a zoom into details is performed. In this context, the method 100 has the effect that unnecessary waiting times for the data transfer to the rendering device 4 and for the graphical rendering may be avoided, particularly if the zoom level is changed frequently. Also, the printing of diagrams 2 would take considerably longer if, without having regard to the available resolution, simply all data records 1a-1h were processed: Many points would then simply be printed on top of each other, and if the printer uses a description language such as PostScript, the amount of data would be inflated further.

FIG. 4 shows on two examples how the diagram 2 may be enriched with notifications 5a-5h in order to facilitate the interpretation.

Figure 4A:
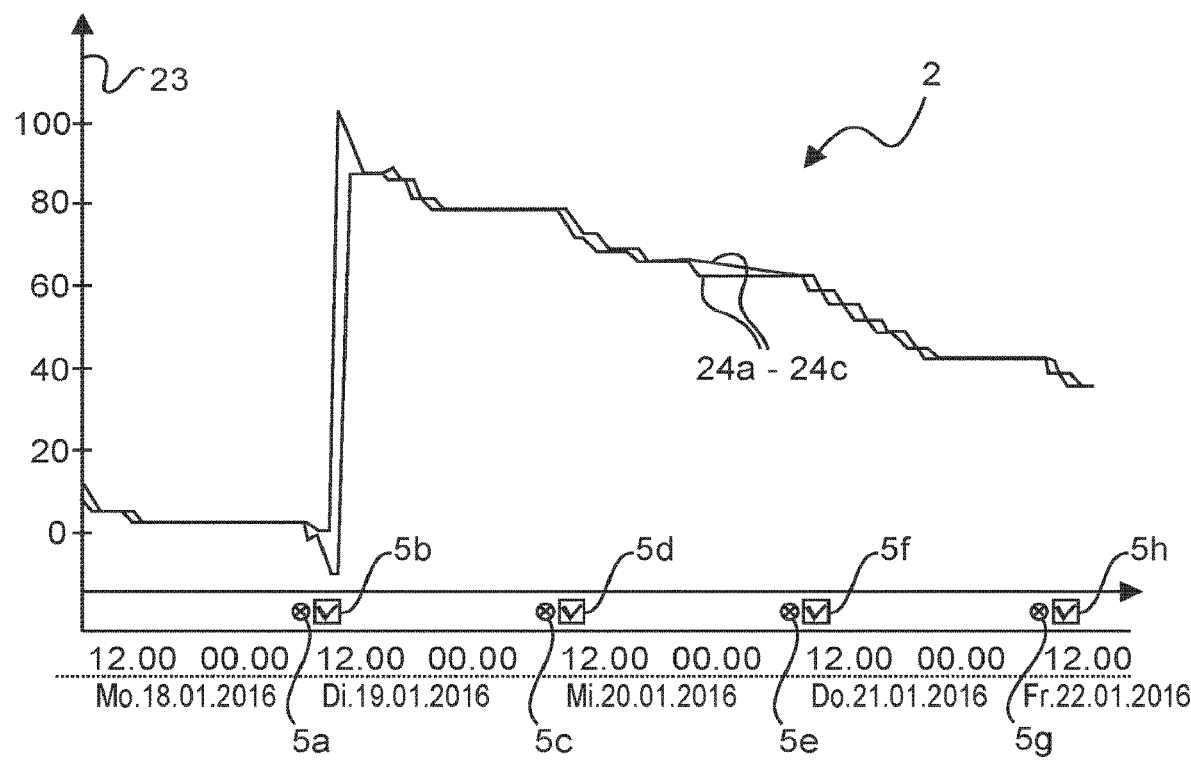
FIG. 4: Enriching the diagram 2 with notifications 5a-5h to facilitate its interpretation.

FIG. 4a shows the first example. Here, four notifications 5a, 5c, 5e and 5g of events of the type "Error coming" are drawn, symbolized by crosses. Each of these notifications is followed in immediate temporal succession by notifications 5b, 5d, 5f and 5h of corresponding events of the type "Error going". The events drawn in FIG. 4a have been aggregated, respectively chosen, from a multitude of events of the respective types according to the method 100. In this example, for the interpretation of the diagram 2, it is paramount to know that events of a particular type have occurred in the respective bin. For example, the notification 5a prompts the observer of the diagram 2 to consider messages of events of the type "Error coming" when searching for an explanation for an abrupt increase of the curve. When a zoom into the diagram 2 shown in FIG. 4a is performed, in analogy to the zooming-in shown in FIG. 3, correspondingly more notifications 5a-5h will be shown.

Figure 4B:
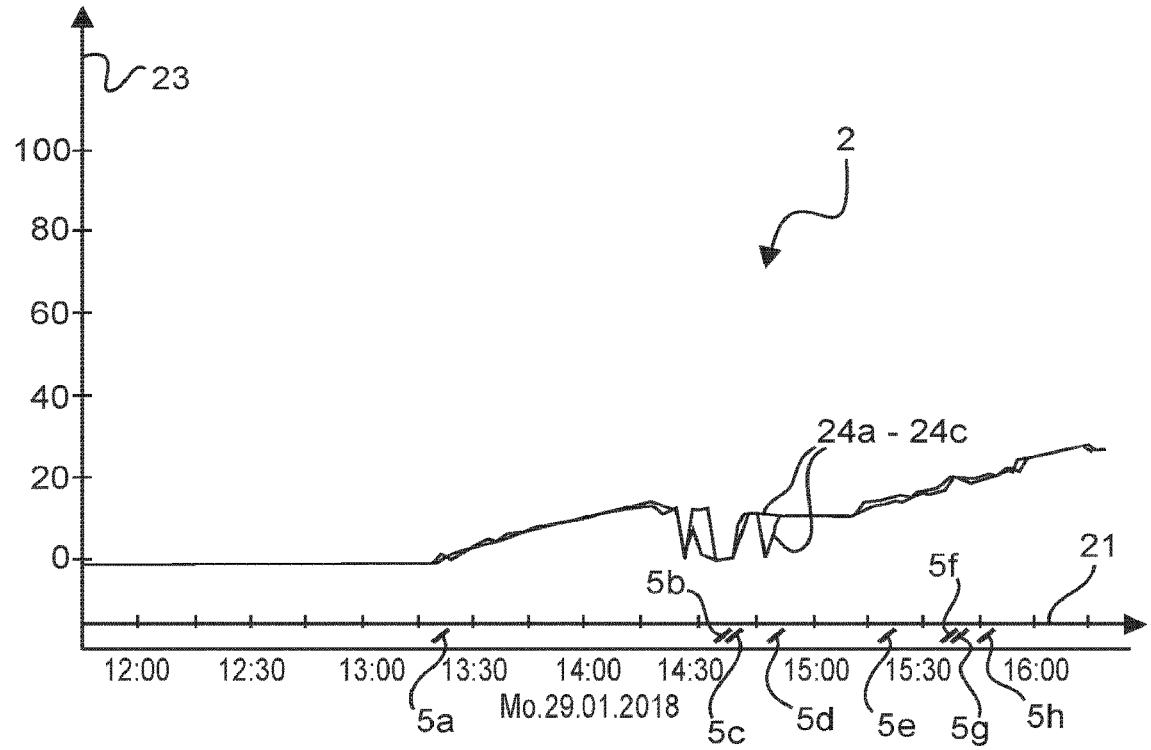

FIG. 4b shows the second example. Here, notifications 5a-5h about state changes of the field device 32 have been transferred into the diagram 2. In this manner, when observing the diagram 2, the analysis is facilitated whether a change of the plotted values 24a-24c results from a real change in the production process or whether a changed configuration of the field device 32, e.g., the change to a more sensitive measurement range, is at least partially responsible. Also, when performing zoom into the diagram 2 shown in FIG. 4b, correspondingly more notifications 5a-5h will appear.

LIST OF REFERENCE SIGNS 1a-1h data records
2 diagram
21 first coordinate
21a-21c bins into which first coordinate 21 is discretized
22 second coordinate
22a-22c bins into which second coordinate 22 is discretized
23 third coordinate
23a-23c value of third coordinate, assigned to bin 21a-21c; 22a-22c
24a-24c chosen and/or aggregated value of third coordinate 23
25a-25b windows for zooming into diagram 2
3 delivering device
31 database as delivering device 3
32 field device as delivering device 3
32a interface of field device 32
4 rendering device
5a-5h notifications about events and state changes
100 method
110 assigning data record 1a-1h to bins 21a-21c; 22a-22c
120 checking number of records 1a-1h per bin 21a-21c; 22a-22c
120a only one value 23a-23c per bin 21a-21c; 22a-22c
120b multiple values per bin 21a-21c; 22a-22c
130 assigning value 23a-23c to bin 21a-21c; 22a-22c
140 choosing and aggregating values 24a-24c with criterion 145
145 criterion for choosing and aggregating 140
150 assigning values 24a-24c to bin 21a-21c; 22a-22c
160 checking number of notifications 5a-5h per bin 21a-21c; 22a-22c 160a only one notification 5a-5h per bin 21a-21c; 22a-22c 160b multiple notifications 5a-5h per bin 21a-21c; 22a-22c 170 assigning single notification to bin 21a-21c; 22a-22c 180 choosing and aggregating notifications 5a-5h 185 criterion for choosing and aggregating 180

190 assigning to bin 21a-21c; 22a-22c after choosing, aggregating 180

The invention claimed is:

1. A method for preprocessing data records for rendering in a diagram, said data records having values of a first coordinate and a third coordinate of the diagram, or values of a first coordinate, a second coordinate and a third coordinate of the diagram, wherein, in the diagram, values of the first coordinate of the diagram, and/or values of the second coordinate of the diagram are discretized in bins, the method comprising:

assigning, to each bin of the first coordinate or to each bin of the second coordinate, data records having a value of the first coordinate or values of the first coordinate and the second coordinate that lies in a respective bin of the first coordinate or that lies in respective bins of the first coordinate and the second coordinate;

checking a number of data records that is assigned to each bin;

when only one data record is assigned to a bin, instructing rendering the diagram using a third coordinate value of the assigned data record; and when multiple data records are assigned to a bin, instructing rendering the diagram using selected third coordinate values of the data records of the assigned bin, determined according to a predetermined criterion in which at least one value is chosen and/or aggregated.

2. The method of claim 1, wherein the predetermined criterion includes choosing a maximum, a minimum, and/or a median, and/or aggregating by averaging.

3. The method of claim 1, wherein the data records are kept available on a delivering device, and the diagram is created by a rendering device, wherein the choosing and/or aggregating is performed on the delivering device.

4. The method of claim 3, wherein the delivering device includes a database.

5. The method of claim 3, wherein a field device that stands in direct relationship with an industrial production process is the delivering device.

6. The method of claim 1, wherein the data records comprise, as values of the third coordinate of the diagram, measurement values that have been determined by a field device that stands in direct relationship with an industrial production process.

7. The method of claim 6, wherein the field device is configured as a fill level gauge, a limit level gauge, a density meter, a flow meter or a pressure gauge.

8. The method of claim 6, wherein the field device has an interface for the outputting the data records, the third coordinate values of the data records, or the selected third coordinate values, and is configured as a two-conductor interface or as a radio interface with a transmission duty cycle of at most 10%.

9. The method of claim 1, wherein notifications about events or state changes corresponding to at least one third coordinate value that is used in the diagram are generated by:

checking a number of notifications that is assigned to each bin of the first coordinate or each bin of the second coordinate;

when only one notification is assigned to a bin, the notification is used for the rendering in the diagram; and when multiple notifications are assigned to a bin, one or more notifications are chosen and/or aggregated therefrom according to a predetermined criterion, and then used for the rendering in the diagram.

10. The method of claim 9, wherein the criterion includes a priority, and/or a category, of the notifications.

11. A non-transitory computer readable medium having stored thereon a program comprising machine-readable instructions that when executed on a computer or on an embedded system, cause the computer or the embedded system, to perform the method of claim 1.

12. A field device or a controller for the field device, comprising:

circuitry configured to preprocess data records for rendering in a diagram, said data values having values of a first coordinate and a third coordinate of the diagram or values of a first coordinate, a second coordinate, and a third coordinate of the diagram, wherein, in the diagram, values of the first coordinate of the diagram, and/or values of the second coordinate of the diagram are discretized in bins, the circuitry being further configured to:

assign to each bin of the first coordinate or to each bin of the second coordinate, data records having a value of the first coordinate or values of the first coordinate and the second coordinate that lies in a respective bin of the first coordinate or that lies in respective bins of the first coordinate and the second coordinate;

check a number of data records that is assigned to each bin;

when only one data record is assigned to a bin, instruct rendering the diagram using a third coordinate value of the assigned data record for the rendering in the diagram; and when multiple data records are assigned to a bin, instruct rendering the diagram using selected third coordinate values of the data records of the assigned bin, determined according to a predetermined criterion in which at least one value is chosen and/or aggregated.

13. The field device or a controller for the field device of claim 12, wherein the predetermined criterion includes choosing a maximum, a minimum, and/or a median, and/or aggregating by averaging.

14. The field device or a controller for the field device of claim 12, wherein the data records comprise, as values of the third coordinate of the diagram, measurement values that have been determined by the field device that stands in direct relationship with an industrial production process.

15. The field device or a controller for the field device of claim 14, wherein the field device is configured as a fill level gauge, a limit level gauge, a density meter, a flow meter or a pressure gauge.

16. The field device or a controller for the field device of claim 12, wherein the field device has an interface for the outputting the data records, the third coordinate values of the data records, or the selected third coordinate values, and is configured as a two-conductor interface or as a radio interface with a transmission duty cycle of at most 10%.

17. The field device or a controller for the field device of claim 12, wherein notifications about events or state changes corresponding to at least one third coordinate value that is used in the diagram are generated by the circuitry being configured to:

check a number of notifications that is assigned to each bin of the first coordinate or each bin of the second coordinate;

when only one notification is assigned to a bin, instruct rendering of the diagram further using the notification; and when multiple notifications are assigned to a bin, instruct rendering of the diagram further using one or more notifications chosen and/or aggregated therefrom according to a predetermined criterion.

18. The field device or a controller for the field device of claim 17, wherein the criterion includes a priority, and/or a category, of the notifications.

* * * * *